Aug. 25, 1970      K. C. ALLISON      3,525,825
ROTOR ASSEMBLY FOR ROTARY ELECTRIC SWITCH
Filed May 5, 1969
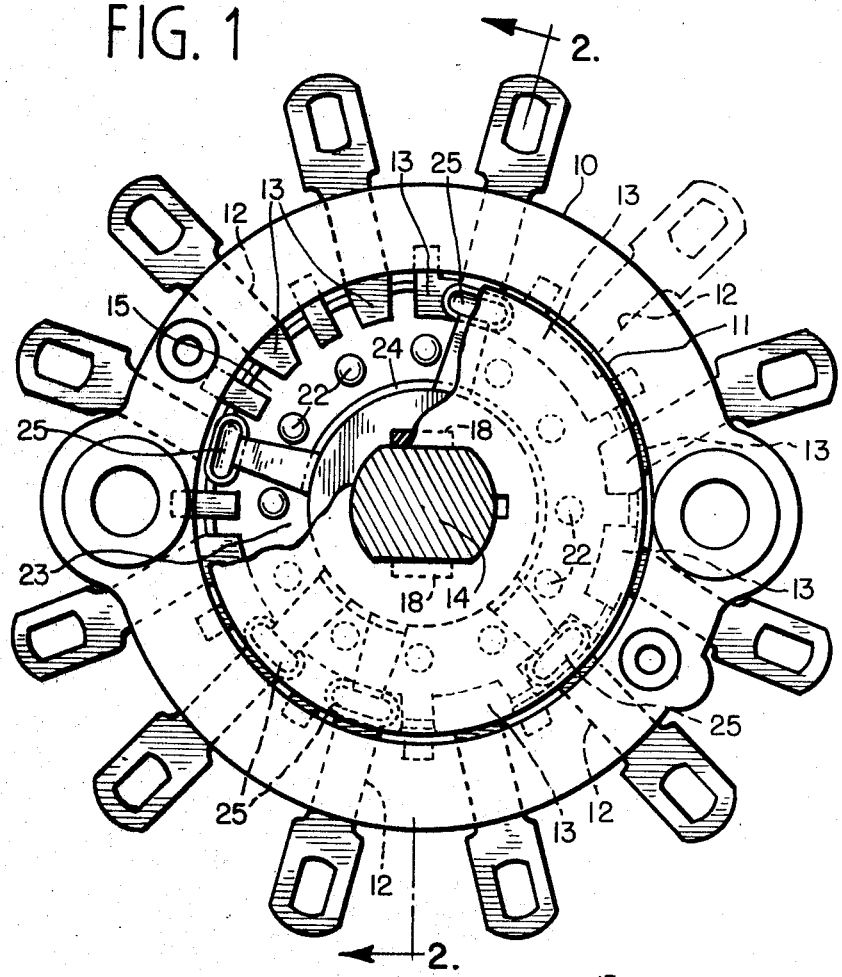
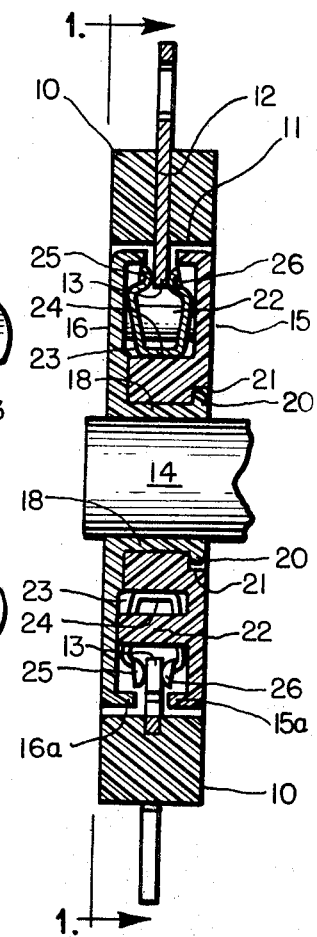
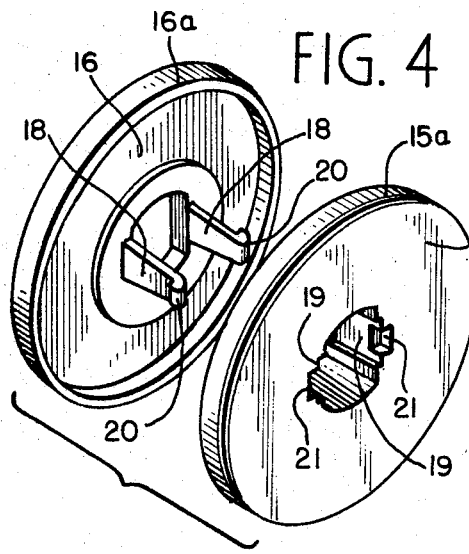
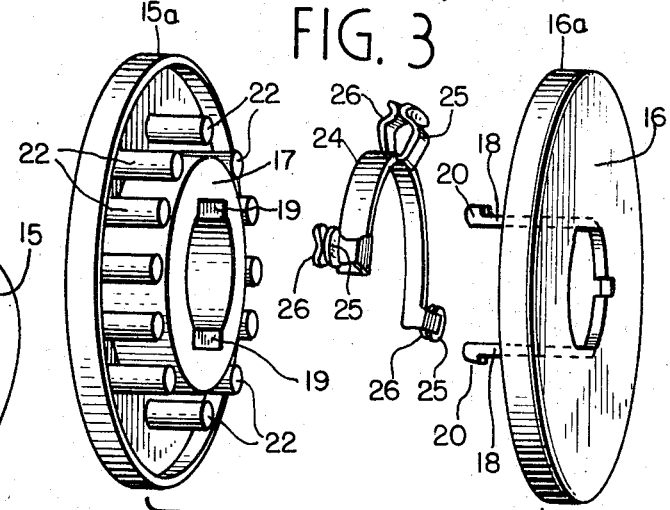
Inventor
Kenneth C. Allison
By _Stanley Hoods_
Attorney United States Patent Office 3,525,825
Patented Aug. 25, 1970

1

3,525,825
ROTOR ASSEMBLY FOR ROTARY ELECTRIC
SWITCH
Kenneth C. Allison, Crystal Lake, Ill., assignor to Kollsman Instrument Corporation, Elmhurst, N.Y., a corporation of New York
Filed May 5, 1969, Ser. No. 821,823
Int. Cl. H01h 19/58
U.S. Cl. 200—11                 5 Claims

ABSTRACT OF THE DISCLOSURE

A rotary electric switch having a stator of insulating material provided with a rotor receiving opening into which stator contacts project in a common plane intermediate planes containing opposite faces of the stator bordering said rotor receiving opening, said rotor including a first section and a second section joined by self-contained coupling means at the hub portions thereof to provide a space between said sections for occupancy by said stator contacts and by rotor contacts sequentially engageable with said stator contacts, while said operatively assembled rotor sections are totally confined between said planes containing opposite faces of the stator bordering said rotor receiving opening.

---

The present invention relates to a rotary electric switch assembly of the type wherein a stator of non-conductive material has a rotor receiving opening into which a series of stator contacts project in coplanar spaced apart relation circumferentially of said opening, and wherein rotor contacts having sequential engagement with said stator contacts are supported on a rotor having first and second sections joined at the hub portions thereof to provide axially spaced apart areas in radially outlying relation to said hub portions for occupancy by said stator contacts and said rotor contacts.

It is an object of this invention to provide a switch of the type indicated wherein said rotor sections are provided with self contained coupling means to secure said sections in fixed assembled relation.

It is a further object to provide a rotary switch wherein the rotor sections so joined by self contained coupling means are of such combined axial dimension as to occupy an operative position within the confines of planes establishing the axial dimension of the stator.

It is also an object of this invention to provide an improved rotor construction which contributes to the production of a rotary switch assembly which is compact, versatile and inexpensive to manufacture.

The foregoing and other objects and features of the present invention will be understood more clearly from the following detailed description taken in connection with the accompanying drawing, wherein:

FIG. 1 is a plan view taken along line 1—1 of FIG. 2 of a rotary switch embodying a stator and rotor assembly in accordance with the present invention.

FIG. 2 is a section taken along line 2—2 of FIG. 1.

FIG. 3 is an exploded view of the rotor assembly including the rotor contact member.

FIG. 4 is a similar exploded view of the rotor sections from a reversed position relative to that shown in FIG. 3.

A switch embodying the features of this invention is adaptable for use in a great variety of applications wherein a plurality of circuits are to be established. The switch shown in the drawing and described hereinafter shows only one of the many contact arrangements available in a switch incorporating a rotor assembly in accordance with this invention.

In the particular embodiment shown herein, reference numeral 10 designates a stator of molded insulating material and having a rotor receiving opening 11 intersecting opposite faces of the stator. Exposed end portions of conductor strips 12 embedded in the stator 10 between opposite faces thereof define stator contacts 13 which occupy a common plane within the confines of the rotor receiving opening 11 while spaced apart circumferentially of the wall of said opening. A rotor operable via a drive shaft 14 to rotate within the opening 11 in the stator 10 about an axis centrally of the opening and perpendicular to the plane occupied by said stator contacts 13 includes a first rotor section 15 and a second rotor section 16. Each section 15 and 16 is formed of suitable insulating material. As illustrated in FIGS. 3 and 4 of the drawing, rotor section 15 is provided with a hub portion 17 in axially extending relation to the area of the section 15 in radially outlying relation to said hub portion. Means for joining rotor section 16 to the hub portions 17 of rotor section 15 so as to establish a rigid axially aligned assembly of said sections includes a pair of coupling fingers 18 defined by axial extensions of the rotor section 16 along opposite edge portions of the opening in which the shaft 14 has driving fit with the rotor section 16. Pockets 19 are formed in opposite wall portions of the opening in which the shaft 14 has driving fit with the hub 17 of rotor section 15 so as to establish axial alignment with the fingers 18 of rotor section 16. The coupling fingers 18 thus have axially slidable interfitting reception in the pockets 19 whereby the rotor sections 15 and 16 are secured in selected relatively rotated interlocked assembly. Each finger 18 has a terminal end portion offset radially outwardly to define a tab 20 which has snap-in engagement with a shoulder 21 bordering the pocket 19 facing the tab 20 so as to fix the rotor sections against unintentional withdrawal from an axially joined operative assembly. Each shoulder 21 is offset axially inwardly of the axial limits of the rotor section 15 facing away from the rotor section 16 so as to maintain the tab 20 associated therewith within said axial limits of the rotor section 15. As shown in FIG. 2, while the rotor sections 15 and 16 are thus joined by the coupling fingers 19, the combined axial dimension of said rotor sections is so limited as to conform to the axial dimension of the stator. It should also be observed that the surface of the shaft 14 and the surfaces of the coupling fingers 19 facing the shaft have such interengagement as to maintain the tabs 20 in a spread apart condition as to prevent withdrawal of the tabs from interlocked engagement with the shoulder 21 associated therewith. The areas of the rotor sections extending radially away from the hub portion 17 are spaced apart axially of the hub 17 to form an annular slot through which the stator contacts 13 have access to the area between the assembled rotor sections 15 and 16.

Reference numeral 22 designates cylindrical axial extensions or division members formed integrally with the rotor section 15 between the area occupied by the stator contacts 13 and the hub portion 17 of rotor section 15. The division members 22 are uniformly spaced apart circumferentiallly of a circle concentric with the hub portion 17 and each member 22 substantially spans the distance between the rotor sections 15 and 16. The surface of the hub portion 17 of rotor section 15 and the surface of the division members 22 opposite thereto cooperate to form an annular clearway 23 therebetween, while the space between each neighboring pair of said division members provides a radial clearway joining said annular clearway 23 with the area occupied by the stator contacts 13. A curved conductor strip 24, as shown in FIG. 3, is confined in said annular clearway 23 while radially outwardly extending branches formed integrally with said strip 24 occupy positions in alignment with selected radial clearways between said division members 22. Each of said branches of the strip 24 defines a pair of resilient axially opposed contact jaws 25 and 26 which have sliding engagement with the stator contacts 13 as the rotor sections 15 and 16 are turned by the shaft 14. It will be observed that the conductor strip 24 is of such dimension measured circumferentially of the clearway 23 that it links the contact jaws 25 and 26 at one end of the strip 24 and the contact jaws 25 and 26 at the other end of the strip at a distance apart in excess of 180 degrees along an arc concentric with the axis of rotation of the rotor sections while the contact jaws 25 and 26 intermediate said end portions of the strip 24 occupy a position at a distance away from said contact jaws 25 and 26 at the ends of the strip not less than 90 degrees along said arc.

Accordingly, a first stator contact 13 and a second stator contact 13 occupying circumferentially spaced apart positions in excess of 90 degrees along the line of travel of the rotor contacts 25 and 26 may be simultaneously electrically connected via the conductor strip 24 and the axially opposed contact jaws 25 and 26 defined by the branches formed integrally with said conductor strip.

A rim 15a along the edge of the rotor section 15 facing the wall of the opening 11 in the stator 10 and a similar rim 16a along the corresponding edge of the rotor section 16 have engagement with the area of the stator contacts 13 between said wall of the opening 11 and that portion of the stator contacts 13 within the line of travel of the rotor contact jaws 25 and 26 to restrict axial movement of the rotor sections 15 and 16 relative to the stator. While the conductor strip 24 is trapped against withdrawal from the clearway in directions radially as well as axially of the rotor section 15, it is to be noted that a slight freedom of movement is available so as to permit sufficient shifting of the rotor contact jaws 25 and 26 to accommodate slight variances in the alignment of the stator contacts 13 relative to the path of movement of such contact jaws incident to rotation of the rotor.

What is claimed is:

1. A rotary switch having a stator of non-conductive material, a rotor receiving opening intersecting opposite faces of said stator, stator contacts secured to said stator and occupying coplanar positions within the confines of said opening in spaced apart relation circumferentially of said opening, a rotor occupying said rotor receiving opening, said rotor having a first section and a second section, said first rotor section having a hub portion in axially extending relation to the area of said first rotor section in radially outlying relation to said hub portion, means joining said second section of the rotor to said first rotor section hub portion to provide a space between said first and second rotor sections for occupancy of said stator contacts, said means including an operating shaft, axially aligned openings in said first and second rotor sections in which said shaft is non-rotatably fitted to rotate said rotor sections in response to rotation of said shaft, coupling fingers defined by axial extensions of said second rotor section along opposite edge portions of the shaft receiving opening in said second rotor section, pockets formed in opposite wall portions of the shaft receiving opening in the hub portion of said first rotor section with which said coupling fingers are axially aligned for reception in said pockets, each of said fingers terminating in a tab having overlapping engagement with surfaces of the first rotor section bordering said pockets and facing away from the second rotor section to prevent axial separation of said first and second rotor sections, and each of said fingers having engagement with said shaft to prevent radial withdrawal of said fingers from said pockets, and rotor contacts occupying seated positions between said first and second rotor sections for sequential engagement with said stator contacts.

2. A rotary switch according to claim 1 wherein said surfaces of said first rotor section engaged by said tabs of the fingers of said second rotor section are defined by shoulders offset axially inwardly from a plane containing the axial limits of the first rotor section facing away from said second rotor section and said tabs are confined to the space between said shoulders and said axial limits of the first rotor section facing away from said sceond rotor section.

3. A rotary switch according to claim 1 wherein said operatively assembled rotor sections are of such total axial dimension as to conform with the axial dimension of the stator.

4. A rotary switch according to claim 1 wherein an annular clearway is defined by the axially extending surface of the hub portion of said first rotor scetion and the surfaces of axially extending division members formed integrally with said first rotor section and occupying positions in uniformly spaced apart relation circumferentially of said hub portion of said first rotor section between said hub portion and the area between said rotor sections occupied by said stator contacts, and said rotor contacts include integral branches of a conductor strip arcuately conforming to and occupying said annular clearway.

5. A rotary switch according to claim 4 wherein said division members substantially span the distance between said first rotor section and the surface of the second rotor section facing said first rotor section.

References Cited

UNITED STATES PATENTS 3,171,906  3/1965  Allison.
3,242,271  3/1966  Stephan et al.

FOREIGN PATENTS 251,309  4/1964  Australia.

ROBERT K. SCHAEFER, Primary Examiner

J. R. SCOTT, Assistant Examiner

U.S. Cl. X.R.
200—168